(12) United States Patent
Koga

(10) Patent No.: US 9,654,228 B2
(45) Date of Patent: May 16, 2017

(54) SIGNAL RECEPTION PROCESSING APPARATUS AND METHOD FOR PROCESSING RECEIVED SIGNAL

(71) Applicant: NEC Corporation, Tokyo (JP)

(72) Inventor: Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/886,619

(22) Filed: Oct. 19, 2015

(65) Prior Publication Data

US 2016/0112155 A1   Apr. 21, 2016

(30) Foreign Application Priority Data

Oct. 20, 2014   (JP) .................... 2014-213892

(51) Int. Cl.
*H04B 10/06*   (2006.01)
*H04B 10/61*   (2013.01)
*H04B 10/079*   (2013.01)
*H04L 1/20*   (2006.01)

(52) U.S. Cl.
CPC ..... *H04B 10/616* (2013.01); *H04B 10/07953* (2013.01); *H04L 1/203* (2013.01)

(58) Field of Classification Search
CPC .. H04B 10/60; H04B 10/616; H04B 10/6161; H04B 10/6163; H04B 10/6164; H04B 10/6165; H04B 10/611; H04B 10/612; H04B 10/613; H04B 10/614; H04B 10/6971

USPC ....... 398/208, 204, 205, 206, 207, 202, 209, 398/210, 212, 213, 214, 147, 158, 159, 398/81, 135, 136, 33, 38, 25, 26, 27, 183, 398/188

See application file for complete search history.

(56) References Cited

U.S. PATENT DOCUMENTS

| | | | |
|---|---|---|---|
| 2012/0148265 A1* | 6/2012 | Chang ................ | H04B 10/6161 398/208 |
| 2014/0341595 A1* | 11/2014 | Harley ................ | H04B 10/616 398/208 |
| 2016/0127048 A1* | 5/2016 | Kikuchi ............. | H04B 10/0795 398/202 |

FOREIGN PATENT DOCUMENTS

JP   2009-232082   10/2009

* cited by examiner

*Primary Examiner* — Hanh Phan
(74) *Attorney, Agent, or Firm* — Finnegan, Henderson, Farabow, Garrett & Dunner, L.L.P.

(57) ABSTRACT

A signal reception processing apparatus includes a digital signal processing unit that calculates a first Q value based on distribution of the symbols of the demodulated signal and distance between the symbols of the demodulated signal, and an error correction unit that outputs corrected signal as a demodulation electric signal, and calculates a second Q value based on an error rate at the time of the correction, and a control unit that calculates a penalty that indicates degradation quantity of signal quality caused by a nonlinear optical effect of an optical fiber based on the first Q value and the second Q value.

20 Claims, 6 Drawing Sheets

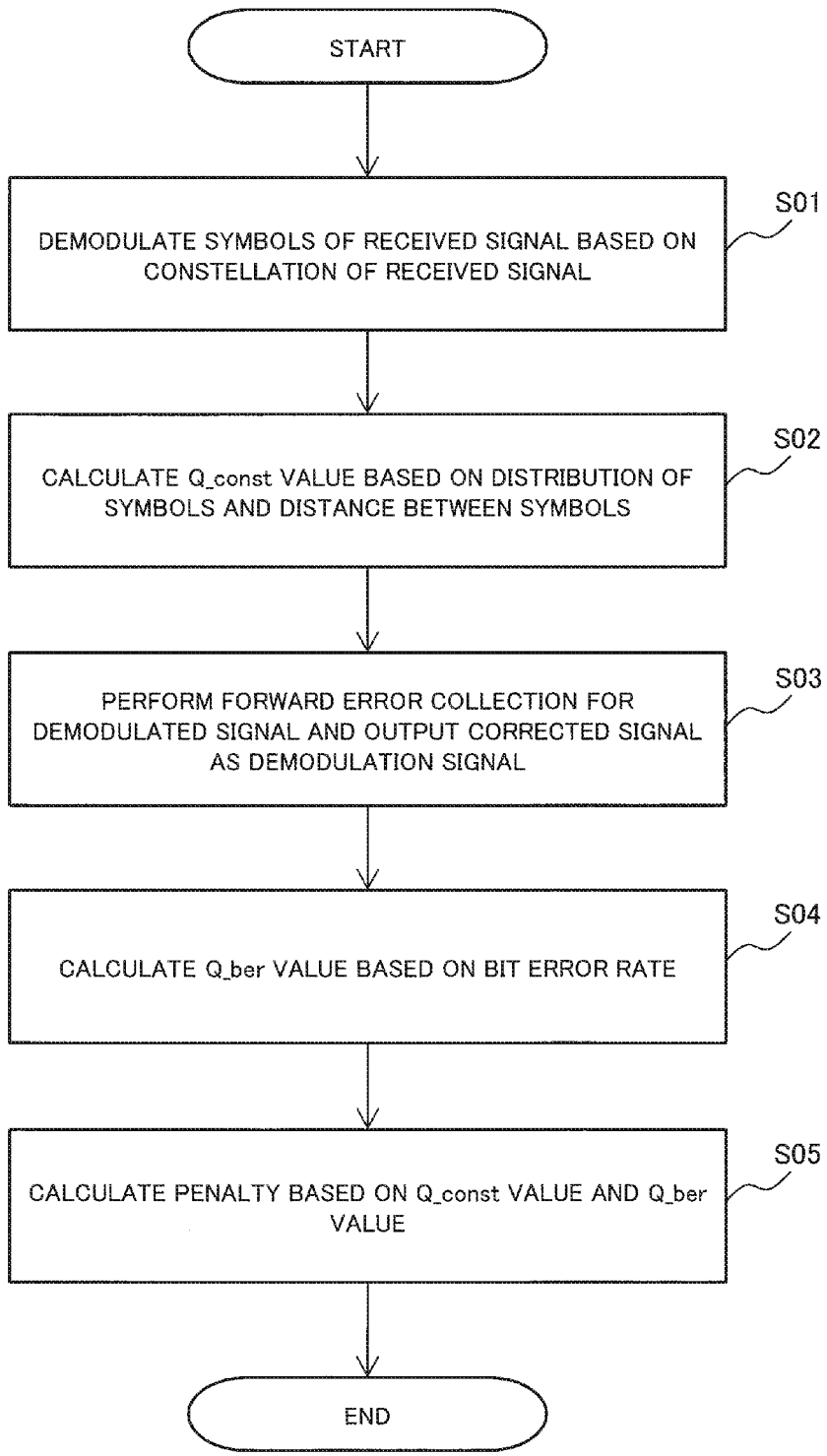

SIGNAL RECEPTION PROCESSING APPARATUS AND METHOD FOR PROCESSING RECEIVED SIGNAL

This application is based upon and claims the benefit of priority from Japanese Patent Application No. 2014-213892, filed on Oct. 20, 2014, the disclosure of which is incorporated herein in its entirety by reference.

TECHNICAL FIELD

The present invention relates to a signal reception processing apparatus and a method for processing received signal and in particular, relates to a signal reception processing apparatus and a method for processing received signal which can monitor characteristic degradation of an optical signal caused by a nonlinear optical effect of an optical fiber.

BACKGROUND ART

Instead of a widely spreading optical transmission system whose transmission rate is 2.5 Gbit/s or 10 Gbit/s, an ultra-high-speed long-distance optical transmission system with 40 Gbit/s, 100 Gbit/s or more has been put to a practical use. In the ultra-high-speed long-distance optical transmission system, a coherent transmission system has been viewed as important instead of an amplitude modulation-direct detection receiving system. In the optical transmission system employing the coherent transmission system, an optical phase modulation technology is used in an optical transmitter. A digital coherent reception technology in which a coherent reception technology and a digital signal processing technology are combined is used for an optical receiver. An optical phase modulation system excels in the characteristics such as an optical signal to noise resistance characteristic, a wavelength dispersion resistance characteristic, and a polarization mode dispersion resistance characteristic which are requested for a long-distance optical fiber transmission.

Research and development on the optical phase modulation system, particularly a modulation and demodulation system such as binary phase shift keying (BPSK), quadrature PSK (QPSK) and polarization multiplexing-QPSK (PM-QPSK) is widely performed from a view point of balance among a transmission characteristic, feasibility and cost. In PM-QPSK, 4 values phase modulation signals which have superiority in optical frequency utilization efficiency are multiplexed by two orthogonal polarized waves in order to expand a transmission capacity without increasing an optical frequency bandwidth to be used.

In the long-distance optical multiplex relaying transmission which employs an optical amplifier, a parameter which has the largest impact on a reception characteristic of a signal light is the optical signal to noise ratio (OSNR) regardless of modulation and demodulation systems. As the transmission distance gets longer, signal degradation caused by a nonlinear optical effect of an optical fiber provides the stronger influence in addition to the signal degradation caused by OSNR deterioration. When performance of a transmission apparatus is monitored, it is very important to specify reception characteristics and deterioration cause of a signal light received in an optical receiver.

In relation to the present invention, Patent Literature 1 (Japanese Patent Application Laid-Open No. 2009-232082) discloses the configuration in which the dispersion compensator is controlled based on the result on identification whether or not the factor of signal quality deterioration is caused by the dispersion in the optical signal transmission apparatus.

SUMMARY

An exemplary object of the invention is to provide the technology to specify the degradation cause of the signal quality in real time by the simple configuration.

An apparatus according to an exemplary aspect of the invention includes: a digital signal processing unit that demodulates symbols of a received signal based on a constellation of the inputted received signal and calculates a first Q value that indicates quality of the received signal based on distribution of the symbols of the demodulated signal and distance between the symbols of the demodulated signal; an error correction unit that performs a forward error correction for the demodulated signal, outputs the corrected signal as a demodulation electric signal, and calculates a second Q value that indicates quality of the received signal based on an error rate at the time of the forward error correction; and a control unit that calculates a penalty that indicates degradation quantity of signal quality caused by a nonlinear optical effect of an optical fiber based on the first Q value and the second Q value.

A method according to an exemplary aspect of the invention includes: demodulating symbols of a received signal based on a constellation of the inputted received signal; calculating a first Q value that indicates quality of the received signal based on distribution of the symbols of the demodulated signal and a distance between the symbols of the demodulated signal; performing a forward error correction for the demodulated signal and outputting the corrected signal as a demodulation electric signal; calculating a second Q value that indicates quality of the received signal based on bit error rate at the time of the forward error correction; and calculating a penalty that indicates a degradation quantity of signal quality caused by a nonlinear optical effect of an optical fiber based on the first Q value and the second Q value.

A recording medium according to an exemplary aspect of the invention stores a signal reception processing program that causes a computer of a signal reception processing apparatus to execute: a process of demodulating symbols of a received signal based on a constellation of the inputted received signal; a process of calculating the first Q value that indicates quality of the received signal based on distribution of the symbols of the demodulated signal and a distance between the symbols of the demodulated signal; a process of performing forward error correction for the demodulated signal and outputting the corrected signal as a demodulation electric signal; a process of calculating the second Q value that indicates quality of the received signal based on a bit error rate at the time of the front error correction; and a process of calculating a penalty that indicates degradation quantity of signal quality caused by a nonlinear optical effect of an optical fiber based on the first Q value and second Q value.

BRIEF DESCRIPTION OF THE DRAWINGS

Exemplary features and advantages of the present invention will become apparent from the following detailed description when taken with the accompanying drawings in which:

FIG. 6 is a flowchart which shows an operation procedure example the signal reception processing apparatus of the second exemplary embodiment.

EXEMPLARY EMBODIMENT

Next, exemplary embodiments of the present invention are described in detail with reference to drawings.

Signal degradation which is caused by a nonlinear optical effect of an optical fiber caused by self-phase modulation (SPM), cross phase modulation (XPM), cross polarization modulation (XPolM), or the like, does not occur steadily and uniformly, but frequently causes to generate a bit error intensively for a short while. A nonlinear optical effect of an optical fiber is simply described below as "nonlinear effect".

On the other hand, as a quality indicator of a light signal, a Q value is used. Generally, the high Q value indicates the high signal quality. In following exemplary embodiments, a Q_ber value and a Q_const value whose calculation methods are different are used as the Q value.

The Q_ber value is calculated from the number of error corrections of FEC (Forward Error Correction). An impulsive bit error caused by the nonlinear effect is certainly included in the number of error corrections of FEC and is counted. In contrast, the Q_const value is obtained by an approximate calculation based on Gaussian distribution from a constellation map in which distribution expansion by random noise is dominant, the random noise including as an amplified spontaneous emission (ASE) noise generated by an optical fiber amplifier. In the Q_const value calculation, the impulsive signal degradation influenced by the nonlinear effect is smoothed by the approximate calculation. As a result, the Q_const value is the Q value which does not include the signal degradation influenced by the nonlinear effect. Accordingly, by comparing the Q_ber value with the Q_const value, degradation quantity of the signal quality influenced by the nonlinear effect (hereinafter, referred to as "penalty") can be obtained.

The Q_ber value is obtained by calculation on a real-time basis from the number of error corrections outputted from an error correction unit which performs FEC. The Q_const value is also obtained by calculation on a real-time basis from signal distribution in the constellation map generated by an optical receiver. Here, a device which causes characteristic degradation of a measuring instrument and a signal light are not needed to be added to the optical receiver for calculation of the Q_ber value and the Q_const value. As a result, cause of signal quality degradation can be specified on a real-time basis while suppressing the influence to signal light characteristics and price increase of an apparatus, and the penalty caused by the nonlinear effect can be monitored on a real-time basis, according to following exemplary embodiments.

First Exemplary Embodiment

Figure 1:
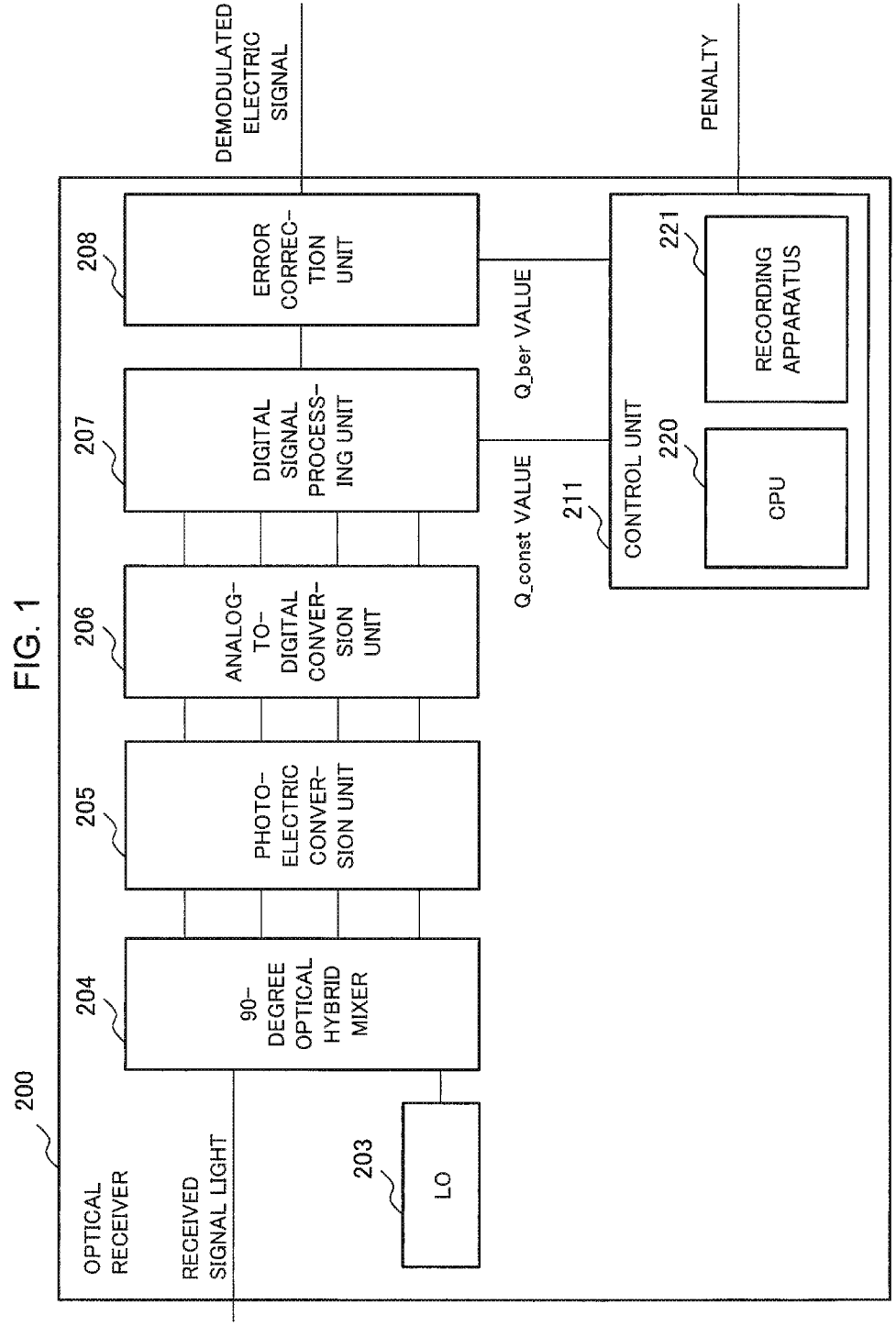
FIG. 1 is a block diagram which shows the configuration of the optical receiver of a first exemplary embodiment.

FIG. 1 is a block diagram which shows a configuration of an optical receiver 200 of a first exemplary embodiment of the present invention. The optical receiver 200 is a QPSK digital coherent optical receiver. The optical receiver 200 includes a local oscillation light source (LO) 203, a 90-degree optical hybrid mixer 204, a photoelectric conversion unit 205, an analog-to-digital conversion unit 206, a digital signal processing unit 207, an error correction unit 208 and a control unit 211.

The 90-degree optical hybrid mixer 204 includes an optical waveguide device, for example. The 90-degree optical hybrid mixer 204 separates an inputted signal light (received signal light) into an in-phase signal light and a quadrature-phase signal light. The LO 203 generates a local oscillation light for generating beat signals with respect to the separated respective received signal lights and inputs the local oscillation light to the 90-degree optical hybrid mixer 204. The LO 203 includes, for example, a semiconductor laser.

The photoelectric conversion unit 205 converts the beat signal generated in the 90-degree optical hybrid mixer 204 into an electric signal. The photoelectric conversion unit 205 is, for example, a high-speed photodiode. The analog-to-digital conversion unit 206 converts the electric signal outputted from the photoelectric conversion unit 205 into a digital signal. The digital signal processing unit 207 demodulates a received signal by digital coherent demodulation processing for the electric signal converted into the digital signal. Since the above mentioned configurations and operations of the LO 203, the 90-degree optical hybrid mixer 204, the photoelectric conversion unit 205, the analog-to-digital conversion unit 206 and the digital signal processing unit 207 are known as a general digital coherent optical receiver, these detailed descriptions are omitted.

Moreover, the digital signal processing unit 207 calculates the Q_const value from the distribution in the constellation map of the demodulated received signal and outputs the Q_const value to the control unit 211. The error correction unit 208 performs the FEC processing for the demodulated received signal, and outputs the FEC-processed signal as a demodulation electric signal. The error correction unit 208 calculates BER (bit error rate) from the number of error corrections in the FEC processing and outputs the Q_ber value calculated based on the BER to the control unit 211. The digital signal processing unit 207 and the error correction unit 208 may be constituted as an arithmetic circuit controlled by, for example, a digital signal processor (DSP).

The control unit 211 acquires the Q_const value from the digital signal processing unit 207 and acquires the Q_ber value from the error correction unit 208. The control unit 211 can monitor the penalty caused by the nonlinear effect on a real-time basis by comparing the Q_const value with the Q_ber value. The control unit 211 may include a central processing unit (CPU) 220 and a recording apparatus 221 such as a semiconductor memory. By a program recorded in the recording apparatus 221, CPU 220 may control the whole of the optical receiver 200 including the digital signal processing unit 207, the error correction unit 208 and the control unit 211.

A calculation procedure of the Q_const value and the Q_ber value and a procedure for calculating the penalty caused by the nonlinear effect based on the Q_const value and the Q_ber value are described below.

A relation between the BER and the Q_ber value calculated from the number of error corrections of the FEC in the error correction unit 208 is represented as the formula (1) using a complementary error function (erfc).

$$BER = \frac{1}{2}\mathrm{erfc}\left(\frac{Q\_ber}{\sqrt{2}}\right) \qquad (1)$$

Accordingly, the Q_ber value is represented as the formula (2) using the inverse function of the complementary error function $\mathrm{erfc}^{-1}$.

$$Q\_ber = \sqrt{2} \times \mathrm{erfc}^{-1}(2 \times BER) \qquad (2)$$

Figure 2:
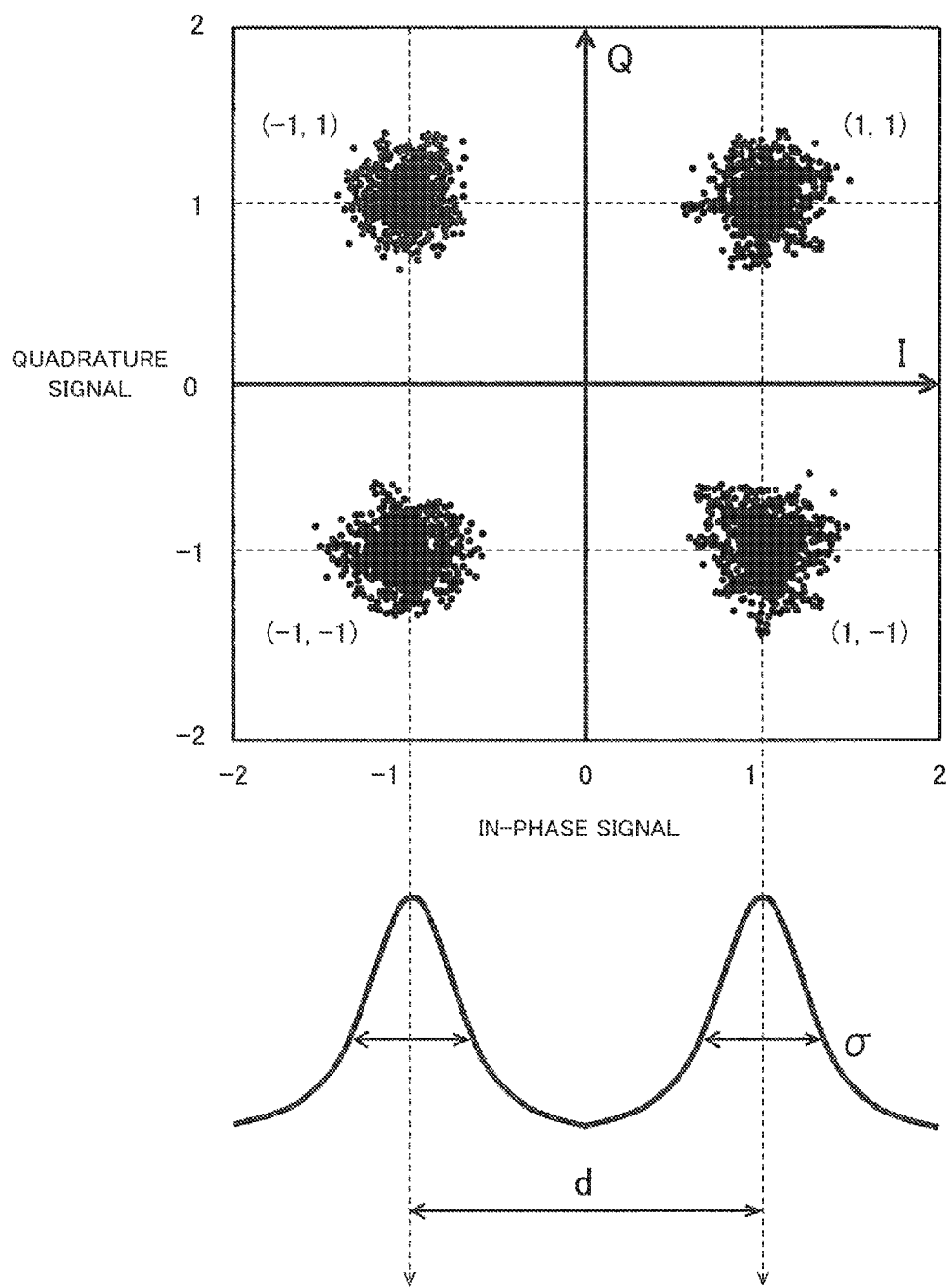
FIG. 2 is a diagram which shows a distribution example of symbols on a constellation of a received signal.

Next, a procedure which calculates the Q_const value from the constellation generated in the digital signal processing unit 207 is described. FIG. 2 is a diagram which shows a distribution example of symbols on the constellation of the received signal. The horizontal axis I in FIG. 2 represents an in-phase signal amplitude, and the vertical axis Q in FIG. 2 represents a quadrature phase signal amplitude. FIG. 2 illustrates four symbols whose amplitude (I, Q) are (1, 1), (1,−1), (−1,−1) and (−1, 1).

Figure 3:
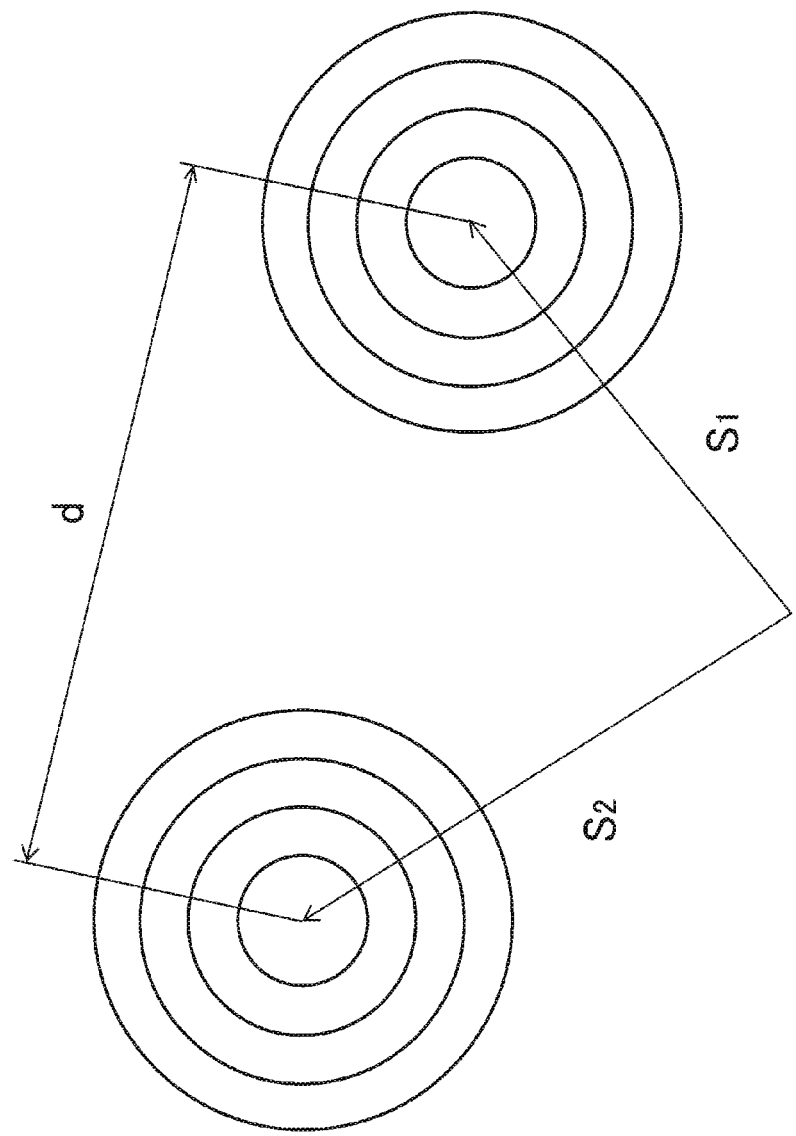
FIG. 3 is a diagram which illustrates an example of a distance between symbols S1 and S2.

FIG. 3 is a diagram which illustrates a distance between the symbols S1 and S2 on the constellation. In the symbols shown in FIG. 2 and FIG. 3, it is assumed that a Euclidean distance between the symbols is d, and noise distribution of the symbols is the Gaussian distribution in which the average is zero and the dispersion is $\sigma^2$. In this case, the probability $BER_{const}$ that the symbol S1 is mistaken for the symbol S2 in FIG. 3 is represented as the formula (3).

$$BER_{const} = \int_{-\infty}^{-d/2} \frac{1}{\sqrt{2\pi}\,\sigma} \exp\left(-\frac{x^2}{2\sigma^2}\right) dx \qquad (3)$$
$$= \frac{1}{2}\mathrm{erfc}\left(\frac{d}{\sqrt{8}\,\sigma}\right)$$

Accordingly, the Q_const value is represented as the formula (4).

$$Q_{\_const} = \sqrt{2}\,\mathrm{erfc}^{-1}(2 \times BER_{const}) \qquad (4)$$
$$= \frac{d}{2\sigma}$$

Figure 4:
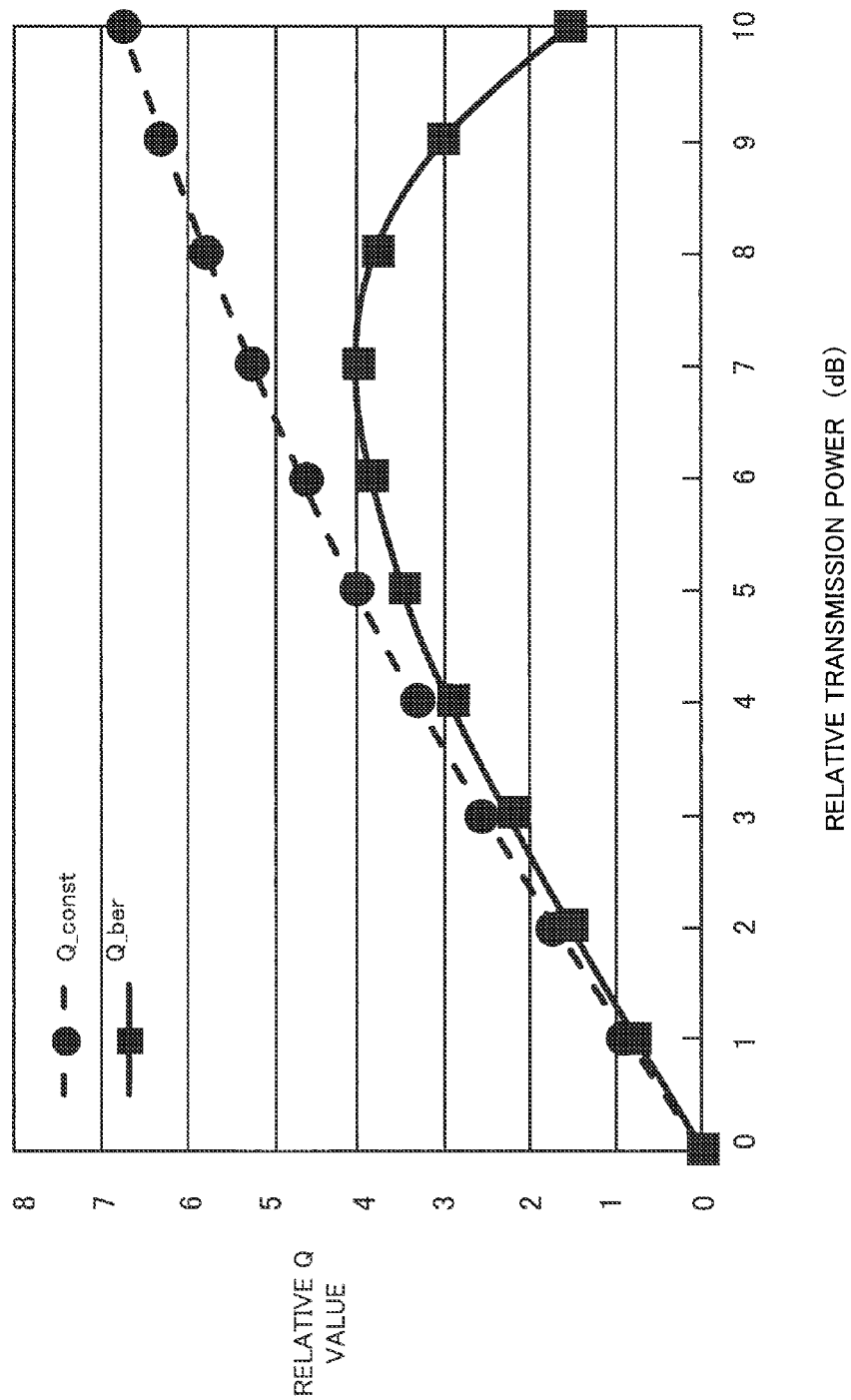
FIG. 4 is a diagram which shows an example of calculation results of a Q_const value and a Q_ber value.

FIG. 4 is a diagram which shows an example of calculation results of the Q_const value and the Q_ber value. FIG. 4 illustrates an example of the Q_const value and the Q_ber value which are calculated based on the received signal light received in the optical receiver 200 through a transmission line by actually changing transmission power of a signal light to an optical fiber which is a transmission line (hereinafter, referred to as "transmission power"). The Q_const value was calculated from the distribution in the constellation map of the received signal. The Q_ber value was calculated from the number of error corrections of the received signal in the error correction unit 208. The horizontal axis of FIG. 4 represents relative transmission power. The vertical axis of FIG. 4 represents the Q_const value (broken line) calculated from the constellation and the Q_ber value (solid line) calculated from the BER. The Q_ber value and the Q_const value represented by the vertical axis of FIG. 4 show relative values (arbitrary scale).

In FIG. 4, the difference between the Q_const value and the Q_ber value indicates the penalty caused by the nonlinear effect. When the transmission power is increased from an initial value (relative transmission power=0 dB), the difference between the Q_const value and the Q_ber value, that is the penalty, is increased gradually. In particular, in FIG. 4, since the Q_ber value is shifted to decreasing when the relative transmission power exceeds 7 dB, the penalty is increased rapidly.

In the case shown in FIG. 4, the Q_ber value takes the optimum value when the relative transmission power takes about 7 dB. The Q_ber value is deteriorated due to influence of the nonlinear effect when the relative transmission power exceeds 7 dB. On the other hand, the Q_ber value is deteriorated due to influence of the random noise such as ASE when the relative transmission power is less than 7 dB.

Accordingly, it can be specified that the signal degradation is mainly caused by the linear degradation such as the ASE noise when the Q_ber value rises due to increase of the relative transmission power. If the cause of the signal degradation is the linear degradation caused by such random noise, the Q_ber value and the Q_const value are improved by increasing the transmission power. This is because OSNR in the received optical signal is increased due to increase of the transmission power.

However, when the signal degradation caused by the nonlinear effect is large, OSNR of the received optical signal is improved, the Q_const value is improved by increasing the transmission power, and the Q_ber value is decreased due to the nonlinear effect. As a result, when the signal degradation caused by the nonlinear effect is large, the increase of the penalty due to the decrease of the Q_ber value becomes more dominant than an improvement effect of the Q_const value. In such case, the signal quality is deteriorated when the transmission power is increased. Accordingly, it can be specified that the signal quality degradation is caused by the nonlinear effect, when the Q_ber value is decreased as the relative transmission power is increased. The penalty can be made small to improve the signal quality by suppressing the Q_ber value deterioration caused by the nonlinear effect by reducing to the transmission power in a domain where the deterioration of the Q_ber value caused by the nonlinear effect rules the signal quality.

In this way, the optical receiver 200 of the first exemplary embodiment calculates on a real time basis the Q_const value and the Q_ber value which are calculated by an electric circuit of the optical receiver. By comparing these values, the penalty caused by a nonlinear effect can be calculated on a real time basis without using measuring equipment and a spectrum device.

Here, procedures for comparing the Q_const value with the Q_ber value on a real time basis does not depend on a transmission rate. The modulation method is not limited to QPSK. That is, the modulation method may be BPSK or 8-value phase modulation. Otherwise, the modulation method may be intensity modulation using a non-return-to-zero (NRZ) or a return-to-zero (RZ) code. Moreover, the modulation method may be a method in which the phase modulation and the amplitude modulation are mixed such as an m-value quadrature amplitude modulation (m-QAM). Thus, the effect of the first exemplary embodiment does not also depend on a modulation and demodulation method.

As described above, the optical receiver of the first exemplary embodiment can specify cause of code error on a real time basis using a simple configuration without adding a measuring unit and any device which may cause characteristic degradation in main optical signal to calculate the penalty due to the nonlinear effect.

The reason is because the signal quality based on the noise such as ASE and the signal quality based on a nonlinear effect are calculated independently using the Q_const value calculated from the distribution of symbols on the constellation map and the Q_ber value calculated from the number of error corrections.

Second Exemplary Embodiment

Figure 5:
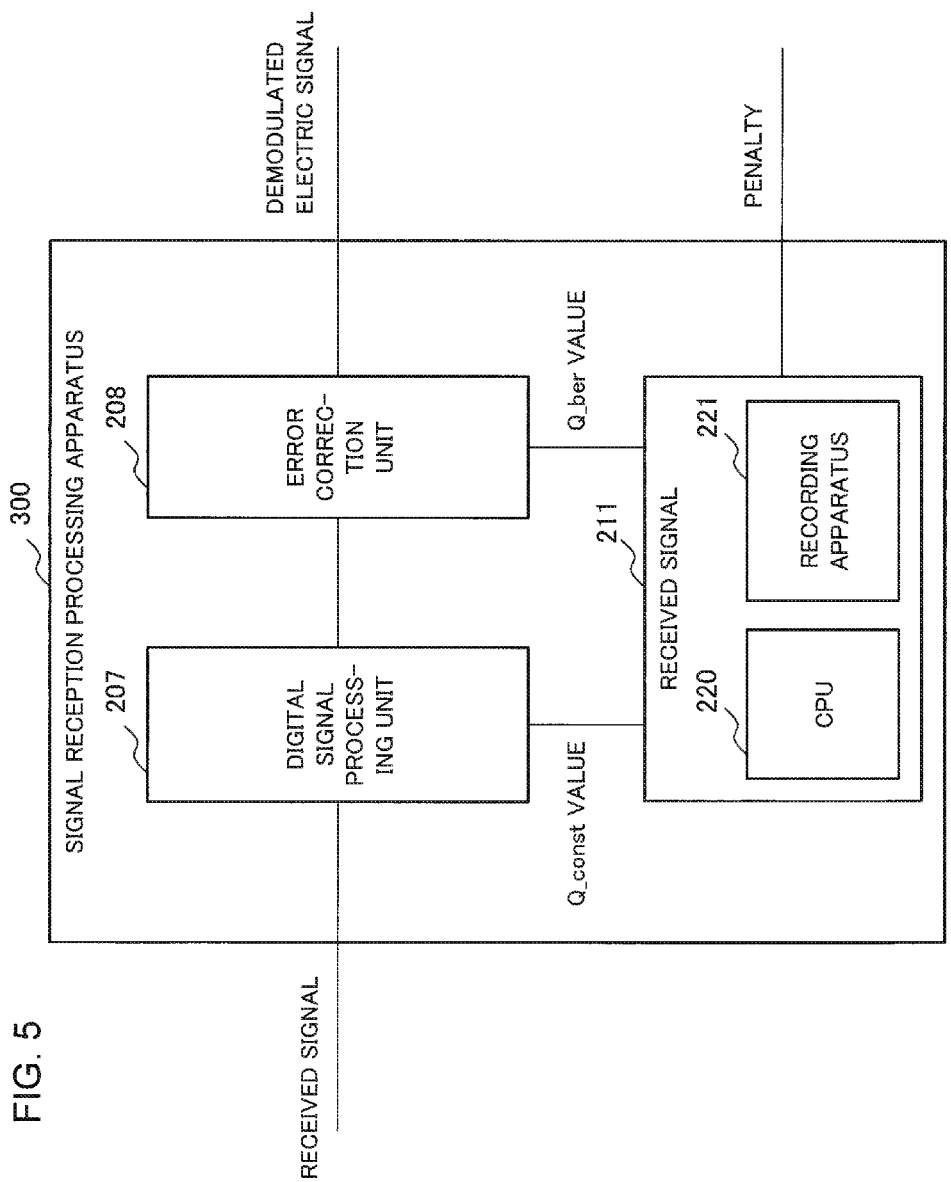
FIG. 5 is a block diagram which shows the configuration of a signal reception processing apparatus of a second exemplary embodiment.

FIG. 5 is a block diagram which shows a configuration of a signal reception processing apparatus 300 of a second exemplary embodiment of the present invention. The signal reception processing apparatus 300 includes the digital signal processing unit 207, the error correction unit 208 and the control unit 211 described in the first exemplary embodiment. The functions of the digital signal processing unit 207, the error correction unit 208 and the control unit 211 described in the first exemplary embodiment can also be described as follows.

The digital signal processing unit 207 demodulates symbols of a received signal based on a constellation of an inputted reception signal. Moreover, the digital signal processing unit 207 calculates a Q_const value (a first Q value) that indicates quality of the received signal based on distribution of the demodulated signal symbols and a distance between the demodulated signal symbols and outputs the Q_const value.

The error correction unit 208 performs forward error correction for the signal demodulated in the digital signal processing unit 207 and outputs the corrected signal as a demodulated electric signal. Moreover, the error correction unit 208 calculates a Q_ber value (a second Q value) that indicates quality of the received signal based on an error rate at the time of forward error correction and outputs the Q_ber value.

The control unit 211 calculates degradation quantity (penalty) of signal quality caused by a nonlinear effect based on the Q_const value and the Q_ber value. For example, the penalty may be calculated from a difference between the Q_const value and the Q_ber value.

FIG. 6 is a flowchart which shows an operation procedure example of the signal reception processing apparatus 300 of the second exemplary embodiment. The digital signal processing unit 207 demodulates a received signal symbol based on a constellation of an inputted received signal (Step S01 of FIG. 6). The digital signal processing unit 207 calculates the Q_const value that indicates the quality of the received signal based on the distribution of the demodulated signal symbols and the distance between the demodulated signal symbols (S02).

Furthermore, the error correction unit 208 performs the forward error collection for the demodulated signal, outputs the corrected signal as a demodulation electric signal (S03) and calculates the Q_ber value that indicates the quality of the received signal based on the symbol error rate at the time of the forward error correction (S04).

The control unit 211 calculates the penalty caused by a nonlinear effect based on the Q_const value and the Q_ber value (S05).

Here, when d is an Euclidean distance between the symbols of received signal and $\sigma^2$ is dispersion of noise distribution of the symbols, the control unit 211 may calculates the Q_const value as $d/(2\sigma)$ as well as the first exemplary embodiment. Furthermore, when BER is a symbol error rate at the time of forward error correction, $erfc^{-1}$ is an inverse function of a complementary error function and $2^{1/2}$ is the square root of 2, the Q_ber value may be calculated as $2^{1/2} \times erfc^{-1}(2 \times BER)$. In addition, Step S02 in FIG. 6 may be located between Step S01 and Step S05.

The signal reception processing apparatus 300 equipped with such configuration can calculate, on a real time basis, the Q_const value and the Q_ber value of the received signal as well as the first exemplary embodiment. And the penalty caused by a nonlinear effect is calculated on a real time basis by comparing the Q_const value with the Q_ber value, and the cause of the signal degradation can be specified. The signal reception processing apparatus 300 of the second exemplary embodiment also enables to specify the cause of the signal quality degradation on a real time basis by a simple configuration and calculate the penalty caused by a nonlinear effect.

Supplementary Notes

Supplementary Note 1

A signal reception processing apparatus comprising:
a digital signal processing unit that demodulates symbols of a received signal based on a constellation of the inputted received signal and calculates a first Q value that indicates quality of the received signal based on distribution of the symbols of the demodulated signal and distance between the symbols of the demodulated signal;
an error correction unit that performs a forward error correction for the demodulated signal, outputs the corrected signal as a demodulation electric signal, and calculates a second Q value that indicates quality of the received signal based on an error rate at the time of the forward error correction; and
a control unit that calculates a penalty that indicates degradation quantity of signal quality caused by a nonlinear optical effect of an optical fiber based on the first Q value and the second Q value.

Supplementary Note 2

The signal reception processing apparatus according to supplementary note 1, wherein
the control unit calculates the penalty based on a difference between the first Q value and the second Q value.

Supplementary Note 3

The signal reception processing apparatus according to supplementary note 1 or 2, wherein
the control unit calculates the first Q value as $d/(2\sigma)$, where d is a Euclidean distance between the symbols, and $\sigma^2$ is dispersion of noise distribution of the symbols.

Supplementary Note 4

The signal reception processing apparatus according to any one of supplementary notes 1 to 3, wherein
the control unit calculates the second Q value as $2^{1/2} \times erfc^{-1}(2 \times BER)$,
where BER is a bit error rate at the time of the forward error correction, $erfc^{-1}$ is an inverse function of a complementary error function, and $2^{1/2}$ is a square root of 2.

Supplementary Note 5

An optical receiver comprising
a signal reception processing apparatus according to any one of supplementary notes 1 to 4;
a local oscillation light source that generates a local oscillation light;
a 90-degree hybrid mixer that separates a received light into an in-phase signal and a quadrature signal, and mixes the separated received lights with the local oscillation light to generate respective beat signals;
a photoelectric conversion unit that converts the beat signals outputted from the 90-degree hybrid mixer into electric signals; and an analog-to-digital conversion unit that converts the electric signals into digital signals and outputs the digital signals, wherein the digital signal processing unit that is equipped in the signal reception processing apparatus performs digital coherent demodulation processing for a signal inputted from the analog-to-digital conversion unit to demodulate a received signal.

Supplementary Note 6

A method for processing a received signal, comprising:
demodulating symbols of a received signal based on a constellation of the inputted received signal;
calculating a first Q value that indicates quality of the received signal based on distribution of the symbols of the demodulated signal and a distance between the symbols of the demodulated signal;
performing a forward error correction for the demodulated signal and outputting the corrected signal as a demodulation electric signal;
calculating a second Q value that indicates quality of the received signal based on bit error rate at the time of the forward error correction; and
calculating a penalty that indicates a degradation quantity of signal quality caused by a nonlinear optical effect of an optical fiber based on the first Q value and the second Q value.

Supplementary Note 7

The method for processing a received signal according to supplementary note 6, wherein
the penalty is calculated based on a difference between the first Q value and the second Q value.

Supplementary Note 8

The method for processing a received signal according to supplementary note 6 or 7, wherein
the first Q value is calculated as $d/(2\sigma)$,
where d is a Euclidean distance between the symbols, and $\sigma^2$ is dispersion of noise distribution of the symbols.

Supplementary Note 9

The method for processing a received signal according to any one of supplementary notes 6 to 8, wherein
the second Q value is calculated as $2^{1/2} \times \mathrm{erfc}^{-1}(2 \times \mathrm{BER})$, where BER is a bit error rate at the time of the forward error correction, $\mathrm{erfc}^{-1}$ is an inverse function of a complementary error function, and $2^{1/2}$ is a square root of 2.

Supplementary Note 10

A non-transitory computer readable recording medium storing a signal reception processing program that causes a computer of a signal reception processing apparatus to execute:
a process of demodulating symbols of a received signal based on a constellation of the inputted received signal;
a process of calculating the first Q value that indicates quality of the received signal based on distribution of the symbols of the demodulated signal and a distance between the symbols of the demodulated signal;
a process of performing forward error correction for the demodulated signal and outputting the corrected signal as a demodulation electric signal;
a process of calculating the second Q value that indicates quality of the received signal based on a bit error rate at the time of the front error correction; and
a process of calculating a penalty that indicates degradation quantity of signal quality caused by a nonlinear optical effect of an optical fiber based on the first Q value and second Q value.

Supplementary Note 11

The non-transitory computer readable recording medium according to supplementary note 10, wherein the penalty is calculated based on a difference between the first Q value and the second Q value.

Supplementary Note 12

The non-transitory computer readable recording medium according to supplementary note 10 or 11, wherein
the first Q value is obtained as $d/(2\sigma)$ assuming that Euclidean distance between the symbols is d and the dispersion of the symbol noise distribution is $\sigma^2$.

Supplementary Note 13

The non-transitory computer readable recording medium according to any one of supplementary notes 10 to 12, wherein
the second Q value is calculated as $2^{1/2} \times \mathrm{erfc}^{-1}(2 \times \mathrm{BER})$, where BER is a bit error rate at the time of the forward error correction, $\mathrm{erfc}^{-1}$ is an inverse function of a complementary error function, and $2^{1/2}$ is a square root of 2.

Supplementary Note 14

A signal reception processing apparatus comprising:
digital signal processing means configured to demodulate symbols of a received signal based on a constellation of the inputted received signal and to calculate a first Q value that indicates quality of the received signal based on distribution of the symbols of the demodulated signal and distance between the symbols of the demodulated signal;
error correction means configured to perform a forward error correction for the demodulated signal, to output the corrected signal as a demodulation electric signal, and to calculate a second Q value that indicates quality of the received signal based on an error rate at the time of the forward error correction; and
control means configured to calculate a penalty that indicates degradation quantity of signal quality caused by a nonlinear optical effect of an optical fiber based on the first Q value and the second Q value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:
1. A signal reception processing apparatus comprising:
a digital signal processor that demodulates symbols of a received signal based on a constellation of the inputted received signal and calculates a first Q value that indicates a quality of the received signal based on distribution of the symbols of the demodulated signal and distance between the symbols of the demodulated signal;

an error corrector comprising one or more processors configured to perform a forward error correction for the demodulated signal, output the corrected signal as a demodulation electric signal, and calculate a second Q value that indicates a quality of the received signal based on an error rate at the time of the forward error correction; and a controller that calculates a penalty that indicates a degradation quantity of signal quality caused by a nonlinear optical effect of an optical fiber based on the first Q value and the second Q value, wherein the controller calculates the penalty based on a difference between the first Q value and the second Q value.

2. The signal reception processing apparatus according to claim 1, wherein the controller calculates the first Q value as $d/(2\sigma)$, where d is a Euclidean distance between the symbols and $\sigma^2$ is dispersion of noise distribution of the symbols.

3. The signal reception processing apparatus according to claim 1, wherein the controller calculates the second Q value as $2^{1/2} \times \text{erfc}^{-1}(2 \times \text{BER})$, where BER is a bit error rate at the time of the forward error correction, $\text{erfc}^{-1}$ is an inverse function of a complementary error function, and $2^{1/2}$ is a square root of 2.

4. The signal reception processing apparatus according to claim 1, wherein the controller calculates the first Q vale as $d/(2\sigma)$, where d is a Euclidean distance between the symbols and $\sigma^2$ is a dispersion of the noise distribution of the symbols.

5. The signal reception processing apparatus according to claim 1, wherein the controller calculates the second Q value as $2^{1/2} \times \text{erfc}^{-1}(2 \times \text{BER})$, where BER is a bit error rate at the time of the forward error correction, $\text{erfc}^{-1}$ is an inverse function of a complementary error function, and $2^{1/2}$ is a square root of 2.

6. The signal reception processing apparatus according to claim 1, wherein the controller calculates the first Q vale as $d/(2\sigma)$, where d is a Euclidean distance between the symbols and $\sigma^2$ is a dispersion of the noise distribution of the symbols, and calculates the second Q value as $2^{1/2} \times \text{erfc}^{-1}(2 \times \text{BER})$, where BER is a bit error rate at the time of the forward error correction, $\text{erfc}^{-1}$ is an inverse function of a complementary error function, and $2^{1/2}$ is a square root of 2.

7. The signal reception processing apparatus according to claim 1, wherein the controller calculates the first Q vale as $d/(2\sigma)$, where d is a Euclidean distance between the symbols, and $\sigma^2$ is a dispersion of the noise distribution of the symbols, and calculates the second Q value as $2^{1/2} \times \text{erfc}^{-1}(2 \times \text{BER})$, where BER is a bit error rate at the time of the forward error correction, $\text{erfc}^{-1}$ is an inverse function of a complementary error function, and $2^{1/2}$ is a square root of 2.

8. An optical receiver comprising:

a signal reception processing apparatus comprising:

a digital signal processor that demodulates symbols of a received signal based on a constellation of the inputted received signal and calculates a first Q value that indicates a quality of the received signal based on distribution of the symbols of the demodulated signal and a distance between the symbols of the demodulated signal, an error corrector comprising one or more processors configured to perform a forward error correction for the demodulated signal, output the corrected signal as a demodulation electric signal, and calculate a second Q value that indicates a quality of the received signal based on an error rate at the time of the forward error correction, and a controller that calculates a penalty that indicates a degradation quantity of signal quality caused by a nonlinear optical effect of an optical fiber based on the first Q value and the second Q value, wherein the controller calculates the penalty based on a difference between the first Q value and the second Q value;

a local oscillation light source that generates a local oscillation light;

a 90-degree hybrid mixer that separates a received light into an in-phase signal and a quadrature signal, and mixes the separated received lights with the local oscillation light to generate respective beat signals;

a photoelectric converter that converts the beat signals outputted from the 90-degree hybrid mixer into electric signals; and an analog-to-digital converter that converts the electric signals into digital signals and outputs the digital signals, wherein the digital signal processor that is equipped in the signal reception processing apparatus performs digital coherent demodulation processing for a signal inputted from the analog-to-digital converter conversion unit to demodulate a received signal.

9. A method for processing a received signal, comprising:

demodulating symbols of a received signal based on a constellation of the inputted received signal;

calculating a first Q value that indicates a quality of the received signal based on distribution of the symbols of the demodulated signal and a distance between the symbols of the demodulated signal;

performing a forward error correction for the demodulated signal and outputting the corrected signal as a demodulation electric signal;

calculating a second Q value that indicates a quality of the received signal based on bit error rate at the time of the forward error correction; and calculating a penalty that indicates a degradation quantity of signal quality caused by a nonlinear optical effect of an optical fiber based on the first Q value and the second Q value, wherein calculating the penalty is based on a difference between the first Q value and the second Q value.

10. The method for processing a received signal according to claim 9, wherein the first Q value is calculated as $d/(2\sigma)$, where d is a Euclidean distance between the symbols and $\sigma^2$ is dispersion of noise distribution of the symbols.

11. The method for processing a received signal according to claim 9, wherein the second Q value is calculated as $2^{1/2} \times \text{erfc}^{-1}(2 \times \text{BER})$, where BER is a bit error rate at the time of the forward error correction, $\text{erfc}^{-1}$ is an inverse function of a complementary error function, and $2^{1/2}$ is a square root of 2.

12. The method for processing a received signal according to claim 9, wherein the first Q value is calculated as $d/(2\sigma)$, where d is a Euclidean distance between the symbols and $\sigma^2$ is dispersion of noise distribution of the symbols.

13. The method for processing a received signal according to claim 9, wherein the second Q value is calculated as $2^{1/2} \times e^{-1}(2 \times \text{BER})$, where BER is a bit error rate at the time of the forward error correction, $erfc^{-1}$ is an inverse function of a complementary error function, and $2^{1/2}$ is a square root of 2.

14. The method for processing a received signal according to claim 9, wherein the first Q value is calculated as $d/(2\sigma)$, where d is a Euclidean distance between the symbols and $\sigma^2$ is dispersion of noise distribution of the symbols, and wherein the second Q value is calculated as $2^{1/2} \times erfc^{-1}(2 \times BER)$, where BER is a bit error rate at the time of the forward error correction, $erfc^{-1}$ is an inverse function of a complementary error function, and $2^{1/2}$ is a square root of 2.

15. A non-transitory computer readable recording medium storing a signal reception processing program that, when executed by a computer of a signal reception processing apparatus, causes the computer of a signal reception processing apparatus to perform the steps of:
   demodulating symbols of a received signal based on a constellation of the inputted received signal;
   calculating the first Q value that indicates a quality of the received signal based on distribution of the symbols of the demodulated signal and a distance between the symbols of the demodulated signal;
   performing forward error correction for the demodulated signal and outputting the corrected signal as a demodulation electric signal;
   calculating the second Q value that indicates a quality of the received signal based on a bit error rate at the time of the front error correction; and
   calculating a penalty that indicates degradation a quantity of signal quality caused by a nonlinear optical effect of an optical fiber based on the first Q value and second Q value, wherein calculating the penalty is based on a difference between the first Q value and the second Q value.

16. The non-transitory computer readable recording medium according to claim 15, wherein the first Q value is obtained as $d/(2\sigma)$ assuming that a Euclidean distance between the symbols is d and the dispersion of the symbol noise distribution is $\sigma^2$.

17. The non-transitory computer readable recording medium according to claim 15, wherein the second Q value is calculated as $2^{1/2} \times erfc^{-1}(2 \times BER)$, where BER is a bit error rate at the time of the forward error correction, $erfc^{-1}$ is an inverse function of a complementary error function, and $2^{1/2}$ is a square root of 2.

18. The method for processing a received signal according to claim 15, wherein the first Q value is calculated as $d/(2\sigma)$, where d is a Euclidean distance between the symbols and $\sigma^2$ is dispersion of noise distribution of the symbols.

19. The method for processing a received signal according to claim 15, wherein the second Q value is calculated as $2^{1/2} \times erfc^{-1}(2 \times BER)$, where BER is a bit error rate at the time of the forward error correction, $erfc^{-1}$ is an inverse function of a complementary error function, and $2^{1/2}$ is a square root of 2.

20. The method for processing a received signal according to claim 15, wherein the first Q value is calculated as $d/(2\sigma)$, where d is a Euclidean distance between the symbols and $\sigma^2$ is dispersion of noise distribution of the symbols, and wherein the second Q value is calculated as $2^{1/2} \times erfc^{-1}(2 \times BER)$, where BER is a bit error rate at the time of the forward error correction, $erfc^{-1}$ is an inverse function of a complementary error function, and $2^{1/2}$ is a square root of 2.

* * * * *

UNITED STATES PATENT AND TRADEMARK OFFICE
CERTIFICATE OF CORRECTION

PATENT NO. : 9,654,228 B2
APPLICATION NO. : 14/886619
DATED : May 16, 2017
INVENTOR(S) : Tadashi Koga It is certified that error appears in the above-identified patent and that said Letters Patent is hereby corrected as shown below:

In the Claims

Claim 4, Column 11, Line 30, "Q vale" should read --Q value--.

Claim 6, Column 11, Line 42, "Q vale" should read --Q value--.

Claim 7, Column 11, Line 51, "Q vale" should read --Q value--.

Claim 8, Column 12, Lines 30-31, "converter conversion unit to demodulate" should read --converter to demodulate--.

Claim 13, Column 12, Line 67, "$2^{1/2} \times e^{-1}(2 \times BER)$," should read --$2^{1/2} \times erfc^{-1}(2 \times BER)$,--.

Claim 15, Column 13, Line 30, "indicates degradation a quantity" should read --indicates a degradation quantity--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*